(12) United States Patent
Fukuda

(10) Patent No.: US 7,412,250 B2
(45) Date of Patent: Aug. 12, 2008

(54) RADIO COMMUNICATION SYSTEM

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 10/529,481

(22) PCT Filed: Sep. 17, 2003

(86) PCT No.: PCT/JP03/11812

§ 371 (c)(1), (2), (4) Date: Mar. 28, 2005

(87) PCT Pub. No.: WO2004/032423

PCT Pub. Date: Apr. 15, 2004

(65) Prior Publication Data

US 2006/0030362 A1 Feb. 9, 2006

(30) Foreign Application Priority Data

Sep. 30, 2002 (JP) ............................. 2002-286885

(51) Int. Cl.
*H04B 15/00* (2006.01)

(52) U.S. Cl. .................... 455/502; 370/395.1

(58) Field of Classification Search ................. 370/312, 370/503, 350, 208, 311, 395.1, 338, 392, 370/409, 459, 442, 252, 437; 455/38.3, 574, 455/502, 509, 512, 450, 451, 452.1, 453
See application file for complete search history.

(56) References Cited

U.S. PATENT DOCUMENTS 3,801,981 A * 4/1974 Alpers ......................... 342/88
6,018,642 A 1/2000 Adachi
6,470,024 B1 * 10/2002 Hamalainen et al. ........ 370/459
6,519,460 B1 * 2/2003 Haartsen ................... 455/452.1
7,058,059 B1 * 6/2006 Henry et al. .............. 370/395.1
2002/0118664 A1 8/2002 Ishibashi et al.
2006/0092868 A1 * 5/2006 Meier .......................... 370/312
2007/0091934 A1 * 4/2007 Myles et al. ................. 370/503

FOREIGN PATENT DOCUMENTS

| CN | 1372179 | 10/2002 |
|---|---|---|
| JP | 9-162798 | 6/1997 |
| JP | 2001-160813 | 6/2001 |
| JP | 2002-204197 | 7/2002 |

* cited by examiner

*Primary Examiner*—Charles N. Appiah
*Assistant Examiner*—Joy Contee
(74) *Attorney, Agent, or Firm*—Frommer Lawrence & Haug LLP; William S. Frommer

(57) ABSTRACT

To realize a wireless communication system capable of keeping a beacon interval fixed, keeping transmission quality, and performing intermittence reception without fail. A wireless communication management device includes and transmits beacon time period information in a main beacon and a sub beacon. Then, a wireless terminal device divides transmission data based on the beacon time period information so that the transmission of the transmission data is finished before the transmission of a main beacon is started. Thereby, overlap of transmission timings of the beacon and the transmission data can be prevented and the beacon interval can be made fixed. This can keep transmission quality, makes the wireless terminal device to perform intermittence reception without fail, and improve the entire data transmission efficiency of the system.

3 Claims, 9 Drawing Sheets

RADIO COMMUNICATION SYSTEM

TECHNICAL FIELD

This invention relates to a wireless communication system, and more particularly, is suitably applied to a wireless LAN (Local Area Network) system, for example.

BACKGROUND ART

Recently, wireless LAN systems, in which the IEEE (Institute of Electrical and Electronics Engineers) 802.11b and IEEE802.11a are typical systems, are widely used. In the wireless LAN systems of the IEEE802.11 type, an autonomous decentralized system using a CSMS/CA (Carrier Sense Multiple Access/Collision Aviodance) scheme as an access scheme is used (for example, refer to a patent reference 1).

That is, FIG. 9 shows a protocol stack of the lower two layers in an OSI (Open System Interconnection) model of an IEEE802.11-type wireless LAN system, which is composed of a data link layer 901 and a physical layer 902.

The data link layer 901 is divided into a LLC (Logical Link Control) sublayer 903 and an MAC (Media Access Control) sublayer 904. In the IEEE wireless LAN system, a logical link control 905 under the IEEE802.2 is defined as the LLC sublayer 903, and the CSMA/CA scheme under the IEEE802.11 is defined as the MAC sublayer 904.

In addition, the physical layer 902 has two definitions, an IEEE802.11b (907) of a direct sequence type using a coding technique called a CCK (Complimentary Code Keying) in 2.4 GHgz band, and an IEEE802.11a (908) using an OFDM (Orthogonal Frequency Division Multiplex) technique in 5 GHz band.

FIG. 10 shows transmission/reception timings in a wireless LAN system using the CSMA/CA scheme of the IEEE802.11. This wireless LAN system is composed of a base station and first to fourth terminal stations, and the first, second and third terminal stations operate in a normal transmission/reception mode and the fourth terminal station operates in an intermittent reception mode.

The base station basically transmits beacons (BC1, BC2, BC3, . . . ) which are used for establishment of synchronization between the terminal stations and for notification of various control information at an interval of a beacon time period Ti. This beacon time period is divided into a period for non-conflict due to polling from the base station and a period for conflict due to conflict (conflict) between the terminal stations. The non-conflict period is notified by a beacon.

During the non-conflict period, only a terminal station specified by polling transmitted from the base station is allowed to perform transmission. For example, polling PL1 is polling for the first terminal station, and the first terminal station transmits a data packet DP1 in response to the reception of the polling PL1. The base station returns an ACK (acknowledgement) signal AC1 when receiving the data packet DP1 correctly. Similarly, polling PL2 is polling for the second terminal station, and the second terminal station transmits a data packet DP2 in response to the reception of the polling PL2. The base station returns an ACK signal AC2 when receiving the data packet DP2 correctly. As to data such as an AV stream which requires real-time property, it is periodically transmitted and received under the control of the base station during the non-conflict period, thus keeping QoS (Quality of Service) of transmission.

During the conflict period, on the contrary, each terminal station receives an ACK signal, and performs carrier sense after waiting for a waiting time based on a corresponding random number (hereinafter, referred to as random backoff time), and performs transmission while the other terminal stations do not perform transmission.

That is, when the first and second terminal stations having data which should be transmitted receives the ACK signal AC2, they carries out the carrier sense after waiting for the random backoff times t1 and t2, respectively. Since the random backoff time t1 of the first terminal station is shorter than the random backoff time t2 of the second terminal station, the first terminal station succeeds the carrier sense and transmits a data packet DP3. The base station returns an ACK signal AC3 for the success of the reception of the data packet DP3. The second terminal station which did not succeed the carrier sense performs the carrier sense again after the reception of the ACK signal AC3, and transmits a data packet DP4.

On the other hand, the fourth terminal operating in the intermittence reception mode receives each beacon transmitted from the base station by performing the intermittence reception at an interval of a beacon time period Ti by synchronizing with the base station. In a case where a beacon includes a call for the own station, the fourth terminal station stops the intermittence reception mode and goes back to the normal transmission/reception mode.

Patent reference 1 Japanese Patent Laid Open 11-74886 (the second to third pages, FIG. 11 and FIG. 12)

Here, due to transmission of a data packet from a terminal station in aforementioned CSMS/CA scheme of the IEEE802.11, transmission of a beacon from the base station may be delayed.

That is, referring to FIG. 10, the third terminal station transmits a data packet DP5 in the last of the conflict period of the beacon time period Ti starting with a beacon BC2. Since this data packet DP5 is transmitted over the beacon time period Ti, the base station has to receive the data packet DP5 to the last, and as a result, it can not transmit a beacon BC3 which was to be transmitted after the beacon time period Ti of the beacon BC2.

As a result, the base station transmits a beacon BC4 at a timing delayed from the beacon time period Ti by a delay time Δt, and therefore a beacon interval lengthens by the delay time Δt. This means that the start timing of a next non-conflict period is delayed, and thus the QoS during the non-conflict period can not be secured, which is a problem.

In addition, the fourth terminal station operating in the intermittence reception mode performs the intermittence reception of beacons at an interval of the beacon time period Ti by synchronizing with the base station. Therefore, if the beacon interval lengthens, a timing of the intermittent reception becomes different from a timing of transmission of a beacon and thus the fourth terminal station operating in the intermittence reception mode can not receive the beacon, which is a problem.

DISCLOSURE OF THE INVENTION

This invention has been made in view of the above points and intends to provide a wireless communication system capable of keeping a fixed beacon interval, securing transmission quality and performing intermittence reception without fail.

In this invention to solve the problems, in a wireless communication system comprising a plurality of wireless terminal devices and a wireless communication management device for managing communication between the plurality of wireless terminal devices, a beacon transmission means is provided in the wireless communication management device for transmitting main beacons at fixed interval for performing synchronization in the wireless communication system and for transmitting sub beacons between the main beacons, and included in the main beacons and the sub beacon are beacon time period information indicating a period of time until the main beacon is transmitted next and at least one of idle information to allow an unspecified wireless terminal device to perform transmission, polling information to make a specified wireless terminal device perform transmission, transmission notification information to make an advance notice of transmission of data after transmission of the beacon to a specified wireless terminal device, and transmission acknowledgement information indicating for a specified wireless terminal device whether reception of data transmitted from the wireless terminal device was successful or unsuccessful.

In addition, a sub beacon is transmitted between the main beacons, the sub beacon including the beacon time period information and at least one of the idle information, the polling information, the transmission notification information, and the transmission acknowledgement information.

In addition, provided in the wireless terminal device are a data division means for comparing the beacon time period information included in the main beacon or sub beacon received, with a required transmission time of transmission data, and when the required transmission time is the beacon time period information or longer, dividing transmission data so that transmission of the transmission data divided is finished before transmission of the main beacon is started, and a data transmission means for transmitting the transmission data.

The main beacon and the sub beacon are transmitted with the beacon time period information included therein, and the wireless terminal device divides and transmits transmission data so that transmission of the transmission data is finished before transmission of the main beacon is started, and thereby overlap of transmission timings of the beacon and the transmission data can be prevented and the beacon interval can be fixed with sure, which can secure transmission quality and perform intermittence reception without fail, and further improve entire data transmission efficiency of the system.

BEST MODE FOR CARRYING OUT THE INVENTION

Hereinafter, one embodiment of this invention will be described in detail with reference to drawings:

(1) Entire Construction of Wireless LAN System

Figure 1:
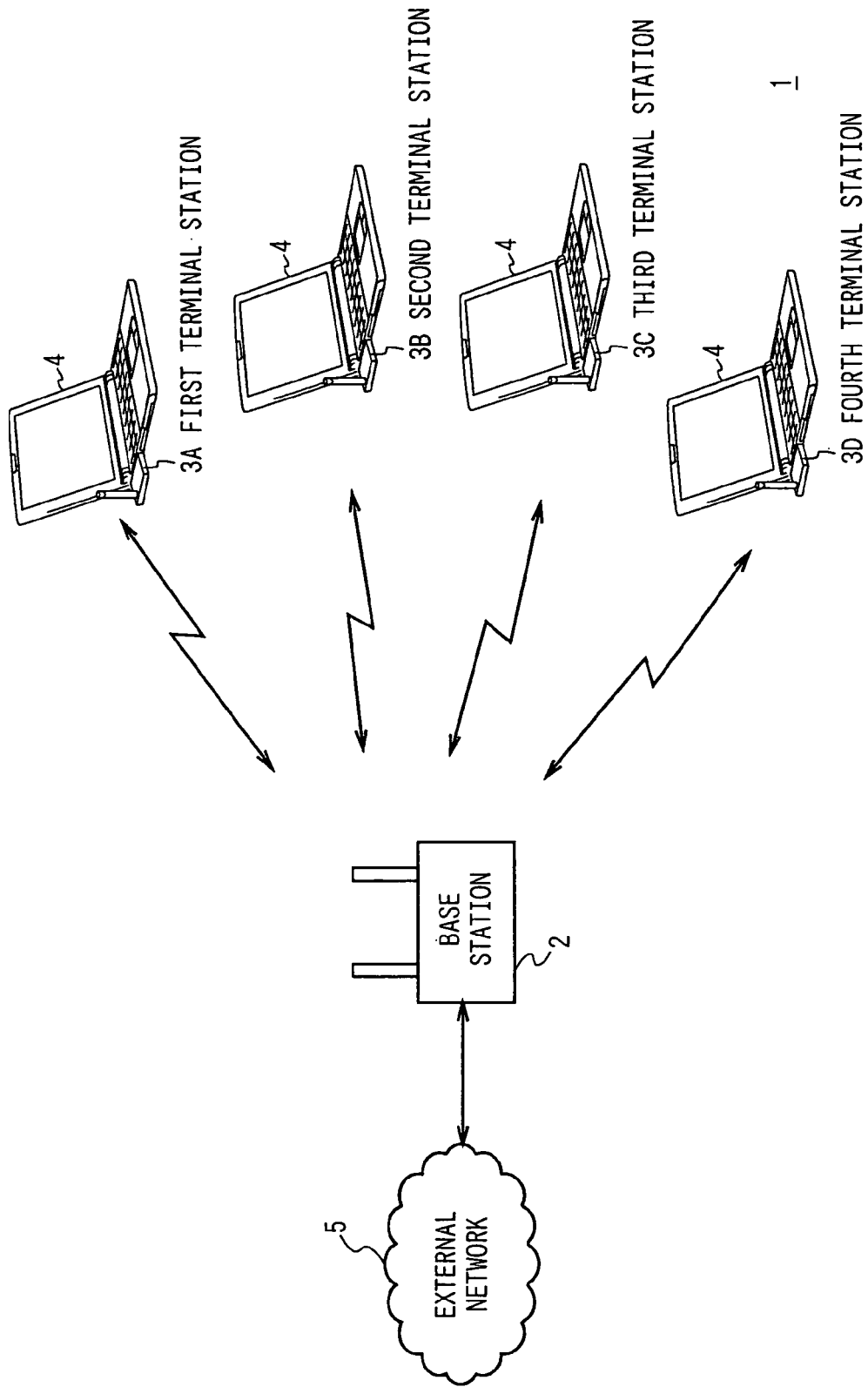
FIG. 1 is a schematic diagram showing the entire construction of a wireless LAN system of this invention.

Referring to FIG. 1, reference numeral 1 generally shows a wireless LAN system as a wireless communication system according to this invention, and this system is composed of a base station 2 as a wireless communication management device and first to fourth terminal stations 3 (3A to 3D). The base station 2 and the terminal stations 3A to 3D perform wireless communication with each other with the CSMA/CA scheme, for example, in 5 GHz band.

In actual, the terminal stations 3A to 3D as wireless terminal devices are wireless LAN cards of a PC card type, and are being inserted into the PC card slots of corresponding notebook personal computers (hereinafter, referred to as notebook personal computer) 4. On the other hand, the base station 2 is connected to an external network 5 such as the Internet and an intranet.

In the wireless LAN system 1, data communication is performed between the notebook personal computers 4 and between an information processing device such as a personal computer connected to the external network 5 and the notebook personal computers 4, via the base station 2 and each terminal station 3A to 3D.

(2) Constructions of Base Station and Terminal Station

Next, the constructions of the base station 2 and the terminal station 3 will be described with reference to FIG. 2 and FIG. 3, respectively.

Figure 2:
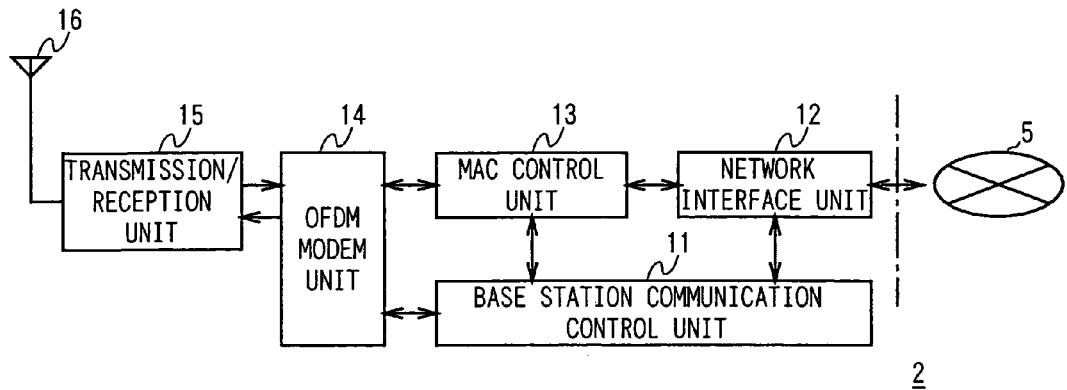
FIG. 2 is a block diagram showing the construction of a base station.

As shown in FIG. 2, in the base station 2, connected to a base station communication control unit 11 is a network interface unit 12, an MAC (Media Access Control) control unit 13, and an OFDM (Orthogonal Frequency Division Multiplex) modem unit 14 as a beacon transmission means. The base station communication control unit 11 entirely controls each unit of the base station 2 under a program for the base station communication control which will be described later.

A transmission/reception unit 15 receives an OFDM signal transmitted from the terminal station 3 via an antenna 16, and supplies it to the OFDM modem unit 14 as a received OFDM modulated signal. The OFDM modem unit 14 demodulates the received OFDM modulated signal and supplies the resultant to the MAC control unit 13 as received data.

The MAC control unit 13 decomposes the radio frame of the received data and supplies the resultant-to the external network 5 via the network interface unit 12 and forms a radio frame from transmission data which is transmitted from the external network 5 via the network interface unit 12 and is directed to the terminal station 3, and then supplies the resultant to the OFDM modem unit 14. The OFDM modem unit 14 as the beacon transmission means modulates the transmission data to create an OFDM modulated signal and transmits the signal via the transmission/reception unit 15 and the antenna 16 serving as the beacon transmission means.

In addition, the MAC control unit 13 performs beacon control, MAC control for data and control packets, and CSMA/CA control.

Figure 3:
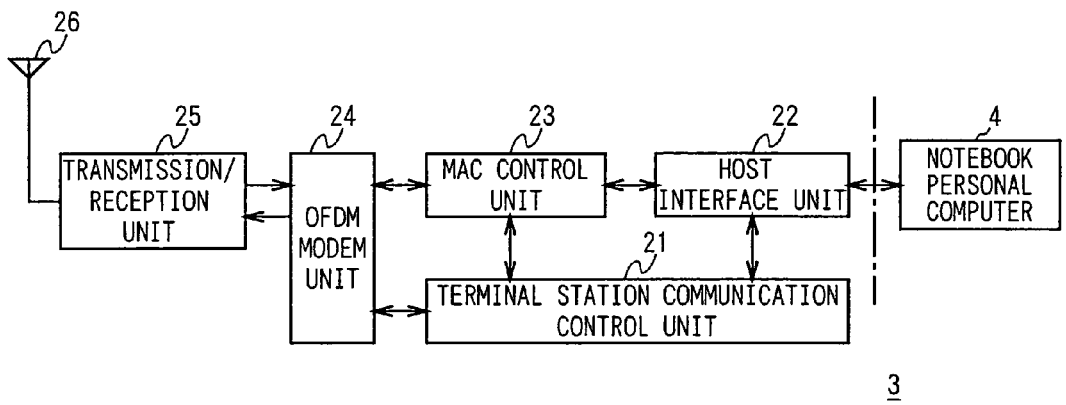
FIG. 3 is a block diagram showing the construction of a terminal station.

On the other hand, as shown in FIG. 3, in each terminal station 3, connected to a terminal station communication control unit 21 are a host interface unit 22, an MAC control unit 23 and an OFDM modem unit 24. The terminal station communication control unit 21 generally controls each unit of the terminal station 3 under a program for the terminal station communication control unit which will be described later.

A transmission/reception unit 25 receives an OFDM signal transmitted from the base station 2 or another terminal station 3, via an antenna 26, and supplies it to the OFDM modem unit 24 as a received OFDM modulated signal. The OFDM modem unit 24 demodulates the received OFDM modulated signal and supplies it to the MAC control unit 23 as received data.

The MAC control unit 23 discomposes the wireless frame of the received data and supplies the resultant to the personal computer 4 via the host interface unit 22 and further, forms a radio frame from transmission data which is supplied from the personal computer 4 via the host interface unit 22 and is directed to the base station 2 or another terminal station 3, and supplies the resultant to the OFDM modem unit 24. The OFDM modem unit 24 as a data transmission means creates an OFDM modulated signal by modulating the transmission data and transmits the signal via the transmission/reception unit 25 and the antenna 26 as the data transmission means.

(3) CSMA/CA Scheme of This Invention

The CSMA/CA scheme in the wireless LAN system 1 of this invention has such features that, in addition to beacons which are periodically transmitted from the base station 2 (hereinafter, referred to as main beacons), a sub beacon is arranged between the main beacons and each terminal station 3 is notified of time period information until a next main beacon and various control information via the main and sub beacons.

Figure 4:
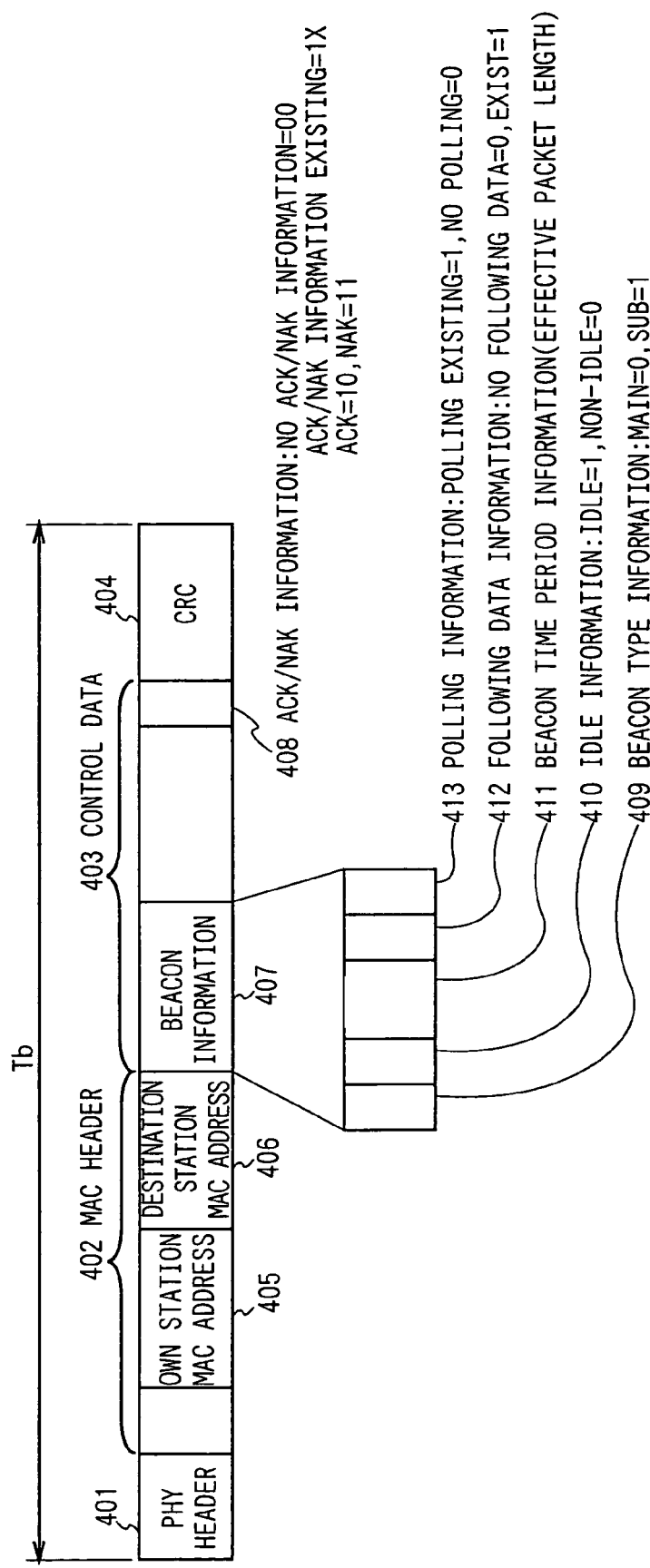
FIG. 4 is a schematic diagram showing the frame format of a beacon.

The frame formats of the main and sub beacons are the same. That is, FIG. 4 shows the frame format of the main and sub beacons, which is composed of a PHY header 401 for performing synchronization in a physical layer by preamble, an MAC header 402 storing a MAC address and so on, control data 403, and a CRC (Cyclic Redundancy Code) 404 for error check. Now, suppose that the time length of the beacon frame is taken as a beacon length Tb.

The MAC header 402 is composed of an own station MAC address 405 of the base station 2, a destination station MAC address 406 of a terminal station 3 which is a polling destination at polling and so on. The control data 403 is composed of beacon information 407, ACK/NAK information 408 and so on.

The beacon information 407 is composed of the following five information components. Beacon type information 409 notifies the type of a beacon, and in a case of a main beacon, 0 is stored, and in a case of a sub beacon, 1 is stored.

Idle information 410 notifies the status of a circuit. If a circuit is in a free status and uplink packets from a terminal station is receivable, "1" is stored as idle status; "0" is stored, otherwise (non-idle status). The idle status corresponds to a conflict period in a conventional example and the non-idle status corresponds to a non-conflict period in the conventional example.

In beacon time period information 411, a beacon time period Tn indicating a period of time until a main beacon to be transmitted next is stored in a unit of, for example, µ second. This beacon time period information 411 is equivalent to the effective packet length of a data packet which is transmittable next.

Following data information 412 as transmission notification information notifies if there is a downlink data packet following the beacon from the base station 2, and when there is no following data, "0" is stored, and when there is following data, "1" is stored.

As to the polling information 413, "1" is stored as polling existing in a case where the polling is performed for the terminal station 3 specified by the destination station MAC address 406, and "0" is stored as no polling in a case where the polling is not performed.

The ACK/NAK information 408 as transmission acknowledgement information is formed in two bits, and in a case where an ACK or NAK (Negative Acknowledgement) signal for the terminal station 3 specified by the destination station MAC address 406 is included in the beacon, "1" is stored in the head bit as ACK/NAK information existing. When an ACK signal is included in the beacon, "0" is stored in the following bit, and "1" is stored when a NAK signal is included. In a case where the ACK and NAK signals are not included in the beacon, "0" is stored in the head bit and the following bit as no ACK/NAK information existing.

Figure 10:
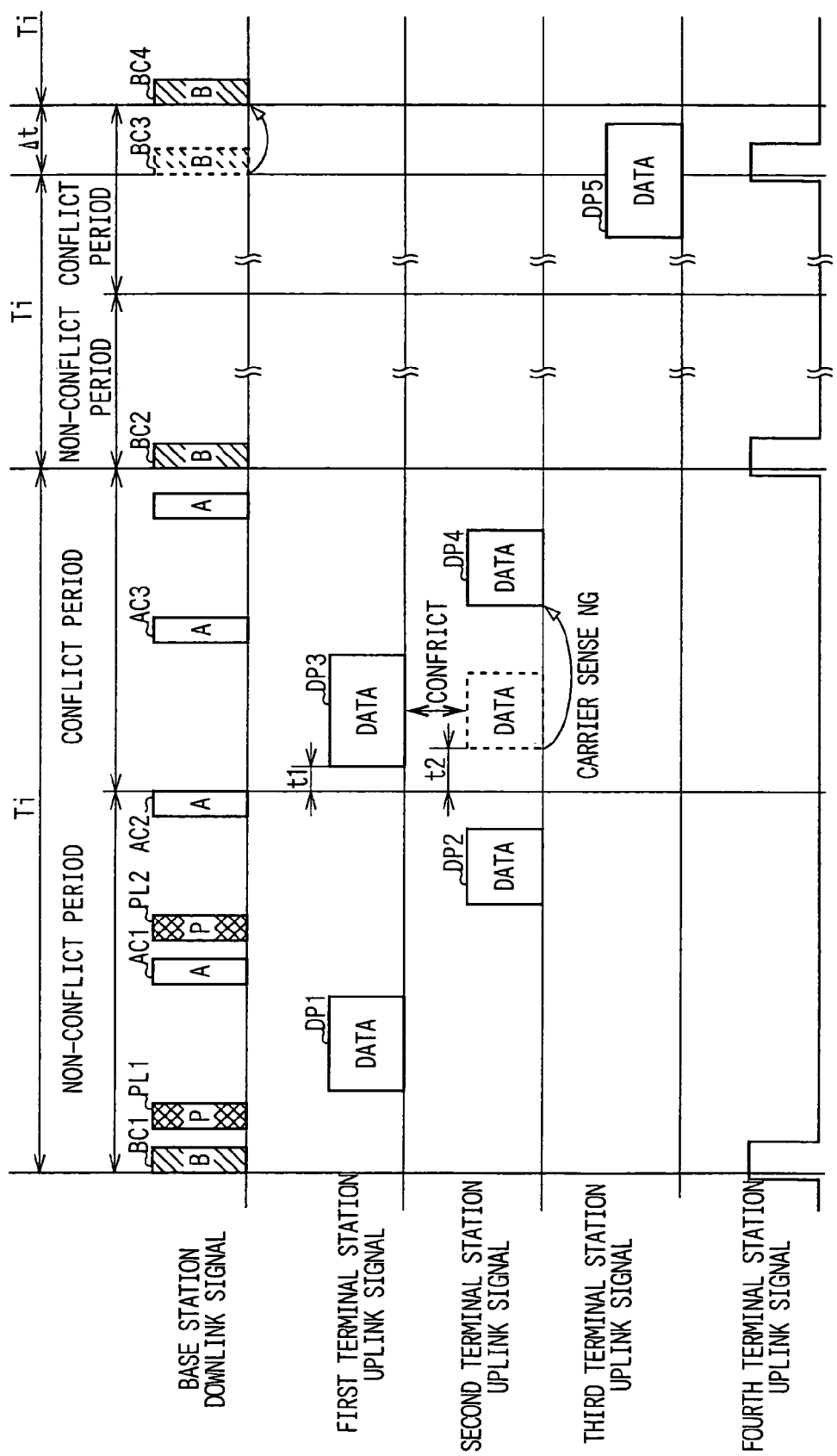
FIG. 10 is a timing chart showing transmission/reception timings in a conventional wireless LAN system.

Next, transmission/reception timings of the main and sub beacons and data packets in the wireless LAN system 1 will be described in detail with reference to FIG. 5. In this case, similarly to FIG. 10, the first to third terminal stations 3A to 3C operate in a normal transmission/reception mode and the fourth terminal station 3D operates in an intermittence reception mode.

The base station 2 transmits main beacons MB1, MB2, MB3 . . . at an interval of a beacon time period Ti. The value of the beacon time period is taken as, for example, 2 [ms].

Figure 5:
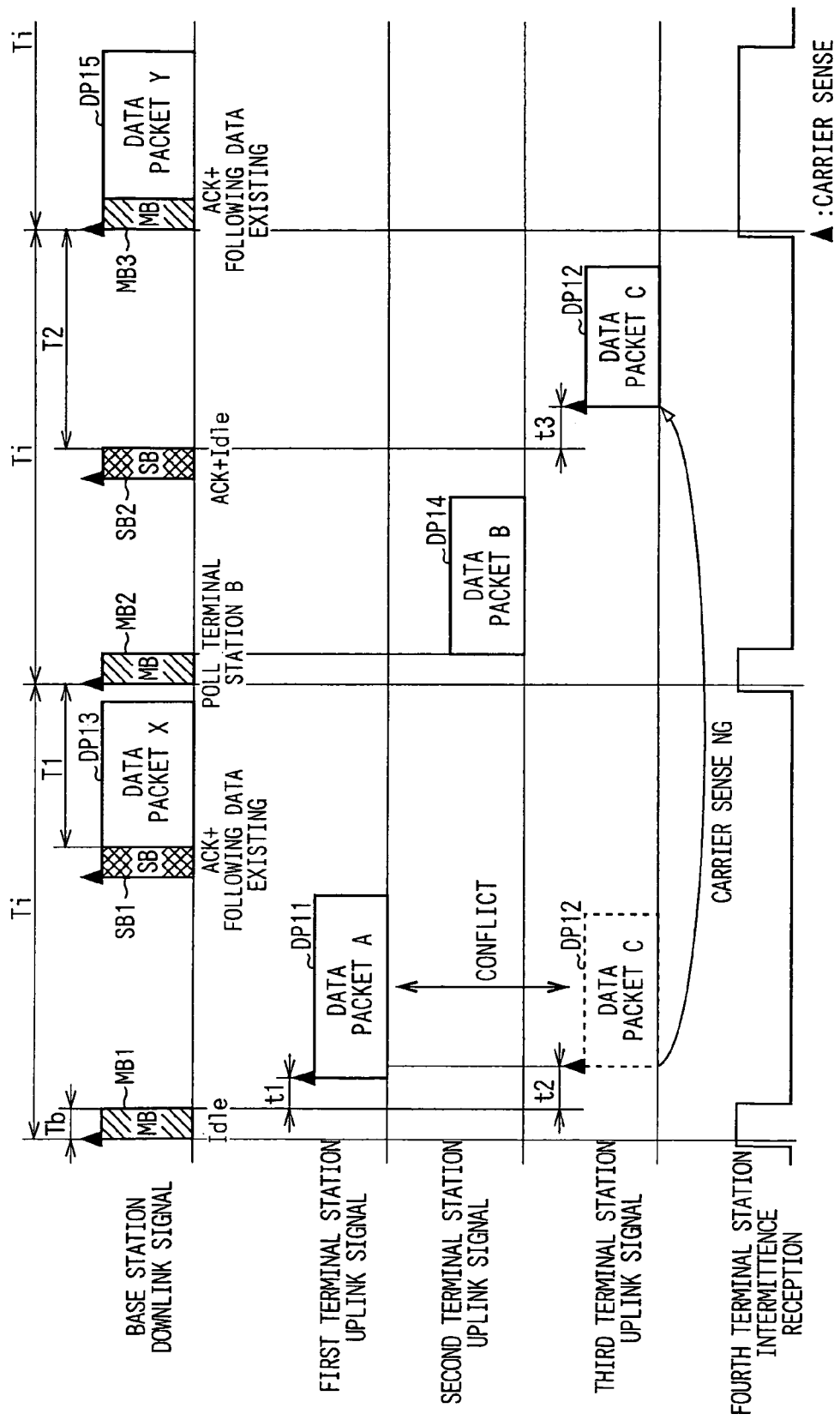
FIG. 5 is a timing chart showing transmission/reception timings in the wireless LAN system of this invention.

In FIG. 5, the base station 2 first transmits a main beacon MD1 indicating that all terminal stations 3 are allowed to perform transmission. This status corresponds to the conflict period of FIG. 10.

That is, in the main beacon MB1, "0" indicative of the main beacon is stored in the beacon type information 409, "1" indicative of the idle status is stored in the idle information 410, and a beacon time period Tn until a next main beacon MB2, which is calculated by the expression (1), is stored in the beacon time period information 411.

$$Tn = Ti - Tb - \alpha \text{ (}\alpha\text{ is a margin)} \quad (1)$$

In addition, "0" indicative of non following data existing is stored in the following data information 412, "0" indicative of no polling in the polling information 413, and "00" indicative of no ACK/NAK information in the ACK/NAK information 408.

In response to the reception of the main beacon MB1 indicative of idle status, the first terminal station 3A and the third terminal station 3V which have data to be transmitted perform carrier sense after waiting for random backoff times t1 and t2, respectively.

Since the random backoff time t1 of the first terminal station 3A is shorter than the random backoff time t2 of the third terminal station 3C, the first terminal station 3A succeeds the carrier sense and transmits a data packet DP11. On the other hand, the third terminal station 3C which did not succeed the carrier sense puts off the transmission of a data packet DP12.

Figure 6:
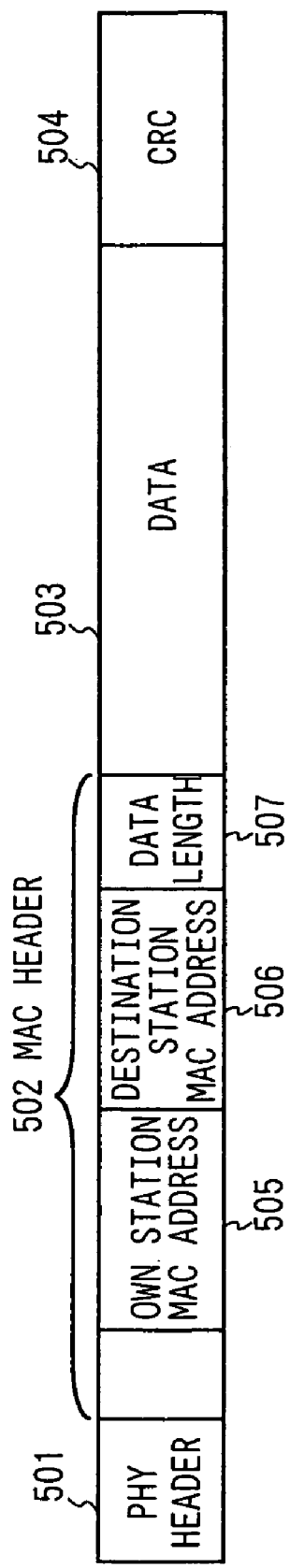
FIG. 6 is a schematic diagram showing the frame format of a data packet.

In this connection, FIG. 6 shows the frame format of the data packet, which is composed of a PHY header 501 for performing synchronization in the physical layer by preamble, an MAC header 502 having an MAC address and so on stored therein, data 503, and a CRC 504 for error check. The MAC header 502 is composed of an own station MAC address 505, a designation station MAC address 506, the data length of the data packet 507 and so on.

The base station 2 transmits a sub beacon SB1 including an ACK signal in response to the successful reception of the data packet DP11.

That is, in the sub beacon SB1, "1" indicative of a sub beacon is stored in the beacon type information 409 and "10" indicative of the ACK signal is stored in the ACK/NAK information 408.

In addition, stored in the beacon time period information 411 is a beacon time period Tn until the next main beacon MB2, which is calculated by the expression (2).

$$Tn = Ti - \alpha \text{ (}\alpha\text{ is a margin)} \quad (2)$$

Further, in this case, since there is a downlink data packet DP1 toward a terminal station 3 from the base station 2, "1" indicative of following data existing is stored in the following data information 412 of the sub beacon SB1, "0" indicative of non-idle status in the idle information 410, "0" indicative of no polling in the polling information 413. In addition, stored in the designation station MAC address 406 of the MAC header 402 is the MAC address of a terminal station which is a transmission designation of the data packet DP13.

Thereby, all terminal stations 3 are prohibited from transmission and only the terminal station 3 (not the terminal stations of FIG. 5 in this example) specified by the designation station MAC address 406 in the sub beacon SB1 waits for the data packet DP13.

Then, the base station 2 transmits the data packet DP13 following the sub beacon SB1. At this time, the base station 2 adjusts the length of the data packet D13 so that the data packet DP13 can be transmitted before the next main beacon MB2.

Next, the base station 2 transmits the main beacon MB2 the beacon time period Ti later from the transmission of the main beacon MB1. At this time, the base station 2 performs polling for the second terminal station 3B.

That is, in the main beacon MB2, "0" indicative of a main beacon is stored in the beacon type information 409, "1" indicative of polling existing in the polling information 413, and the MAC address of the second terminal station 3B which is a polling destination in the destination station MAC address 406.

In addition, "0" indicative of non-idle status is stored in the idle information 410, a beacon time period Tn calculated by the expression (1) in the beacon time period information 411, "0" indicative of no following data existing in the following data information 412, and "00" indicative of no ACK/NAK information in the ACK/NAK information 408.

Since the second terminal station 3B which is a polling destination has data to be transmitted, it transmits a data packet DP14 in response to reception of the main beacon MB2. At this time, the second terminal station 3B polled transmits the data packet PD14 immediately without performing the carrier sense, thereby eliminating a time loss generated by the carrier sense and improving the entire transmission efficiency of the wireless LAN system 1.

The base-station 2 transmits a sub beacon SB2 including an ACK signal in response to the successful reception of the data packet DP14. At this time, since the sub beacon SB2 has no following downlink data packet and polling for any terminal station 3 is not to be performed, the base station 2 gives a permission for transmission to all terminal stations 3.

That is, in the sub beacon SB2, "1" indicative of a sub beacon is stored in the beacon type information 409, and "10" indicative of the ACK signal in the ACK/NAK information 408.

In addition, "0" indicative of no following data is stored in the following data information 412, "1" indicative of idle status in the idle information 410, "0" indicative of no polling existing in the polling information 413, and a beacon time period Tn (Tn=T2−α) until a next main beacon MB3 in the beacon time period information 411.

In response to the reception of the main beacon MB2 indicative of the idle status, the third terminal station 3C which did not succeed the carrier sense in the last idle status performs the carrier sense after waiting for the random back-off time t3, and then transmits the data packet DP12.

Next, the base station 2 transmits the main beacon MB3 a beacon time period Ti later from the transmission of the main beacon MB2. This main beacon MB3 includes an ACK signal for the data packet DP12, a call for the fourth terminal station 3D under the intermittence reception, and existence information of following data for the fourth terminal station 3D.

That is, in the main beacon MB3, "0" indicative of a main beacon is stored in the beacon type information 409, "10" indicative of the ACK signal in the ACK/NAK information 408. In addition, "1" indicative of following data existing in the following data information 412, "0" indicative of non-idle status in the idle information 410, "0" indicative of no polling in the polling information 413, and the MAC address of the fourth terminal station 3D which is a call destination in the designation station MAC address 406.

Thereby, all terminal stations 3 are prohibited from transmission and only the fourth terminal station 3D specified by the designation station MAC address 406 in the main beacon MB3 waits for downlink data.

Here, the fourth terminal station 3D is in the intermittence reception status and intermittently receives only main beacons transmitted from the base station 2. Therefore, by storing the MAC address of the fourth terminal station 3D in the main beacon MB3, the fourth terminal station 3D is back to the normal transmission/reception status from the intermittence reception status, thus receiving the following data packet DP15.

Note that, considering coexistence with other wireless LAN systems, it is desirable that the carrier sense is performed before each beacon is transmitted. However, this is not the essence of this invention.

(4) Transmission/Reception Processing of Base Station and Terminal Station

Next, the aforementioned transmission/reception processing procedures of the base station 2 and the terminal station 3 will be described in detail with reference to the flowcharts of FIG. 7 and FIG. 8. Note that descriptions about the data re-transmission process based on the ACK/NAK signal and the intermittence reception process of the terminal station 3 will be omitted.

In actual, in the base station 2, the base station communication control unit 11 reads and carries out a base station transmission/reception control program being stored in a ROM (Read Only Memory) not shown, to thereby perform the transmission/reception process.

Figure 7:
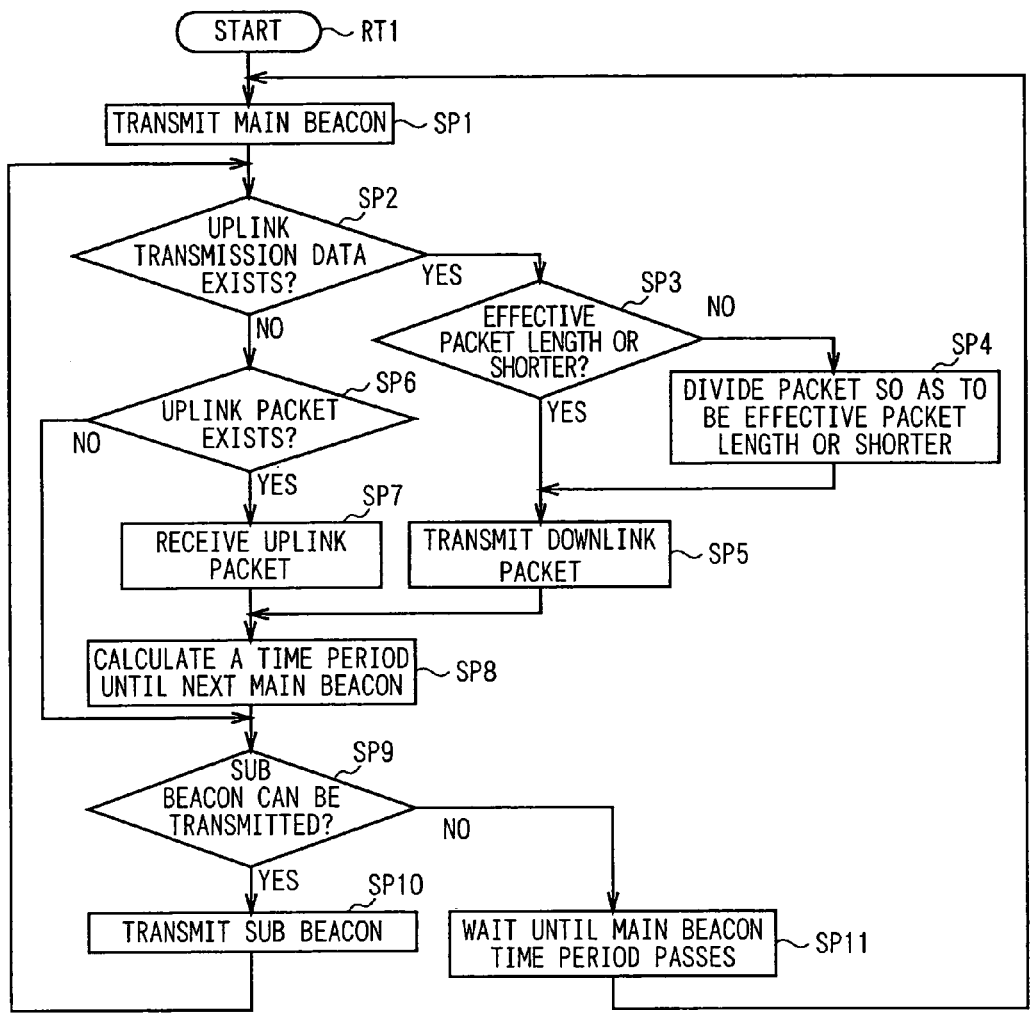
FIG. 7 is a flowchart showing a transmission/reception processing procedure of the base station.

That is, in FIG. 7, the base station communication control unit 11 of the base station 2 moves on to step SP1 from the start step of the routine RT1. At step SP1, the base station communication control unit 11 as the beacon transmission means transmits a main beacon, and then moves on to step SP2 to judge whether downlink transmission data toward the terminal station 3 exists or not.

When there is downlink transmission data at step SP2, the base station communication control unit 11 moves on to step SP3 to compare the packet length of the downlink data packet with the beacon time period Tn (that is, effective packet length) stored in the main beacon.

When the packet length of the downlink data packet is the effective packet length or shorter at step SP3, the base station communication control unit 11 moves on to step SP5 to transmit the downlink data packet and then moves on to step SP8. On the contrary, when the data length of the downlink data packet is longer than the effective packet length, the base station communication control unit 11 moves on to step SP4 to divide the downlink data packet into data packets which are the effective packet length or shorter, and transmits the downlink data packets at step SP5.

On the other hand, when there is no downlink transmission data at step SP2, the base station communication control unit 11 moves on to step SP6 to wait for an uplink data packet from a specified terminal station 3 which is a polling designation or an unspecified terminal station 3, for a prescribed period of time.

When an uplink data packet does not come at step SP6, the base station communication control unit 11 moves on to step SP9. When an uplink data packet came at step SP6, on the contrary, the base station communication control unit 11 moves on to step SP7 to receive the uplink data packet and then moves on to next step SP8.

At step SP8, the base station communication control unit 11 calculates a period of time from completion of the reception of the uplink data packet or completion of the transmission of the downlink data packet until transmission of a next main beacon, and then moves on to next step SP9.

At step SP9, the base station communication control unit 11 judges based on the calculation result of step SP8 before the main beacon, whether a sub beacon can be transmitted or not, expecting a margin β (the minimum value of the data packet length).

When it is judged at step SP9 that the sub beacon can be transmitted, the base station communication control unit 11 as the beacon transmission means moves on to step SP10 to transmit the sub beacon, and then returns back to step SP2. When it is judged at step SP9 that the sub beacon can not be transmitted, on the contrary, the base station communication control unit 11 moves on to step SP11 to wait until the main beacon time period Ti passes, and then returns back to step SP1 to transmit a main beacon.

Thus, the base station 2 transmits main beacons at an interval of the main beacon time period Ti, and transmits a sub beacon between the main beacons.

On the other hand, in the terminal station 3, the terminal station communication control unit 21 reads and carries out the terminal station transmission/reception control program being stored in a ROM not shown, to perform the transmission/reception process.

Figure 8:
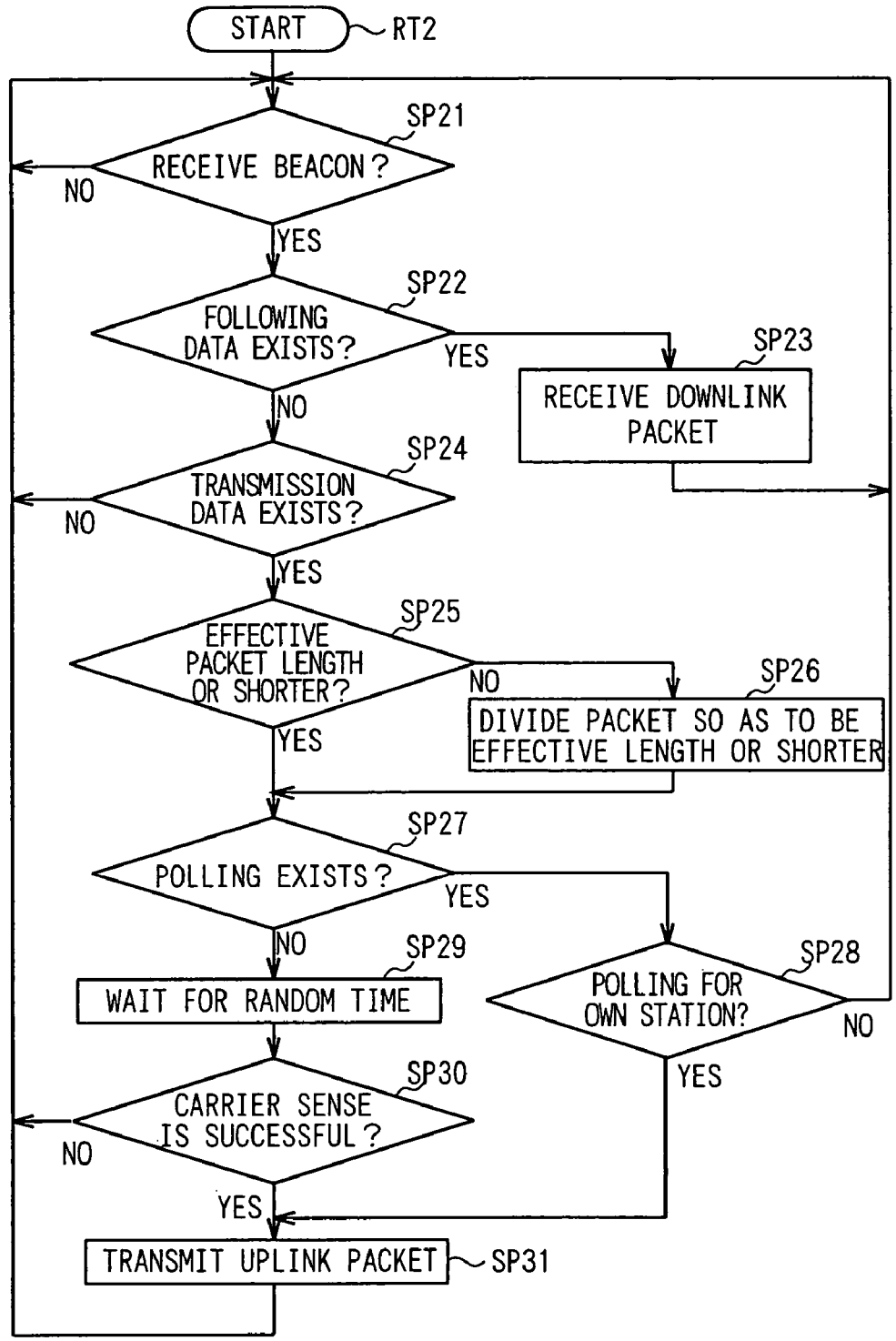
FIG. 8 is a flowchart showing a transmission/reception processing procedure of the terminal station.
Figure 9:
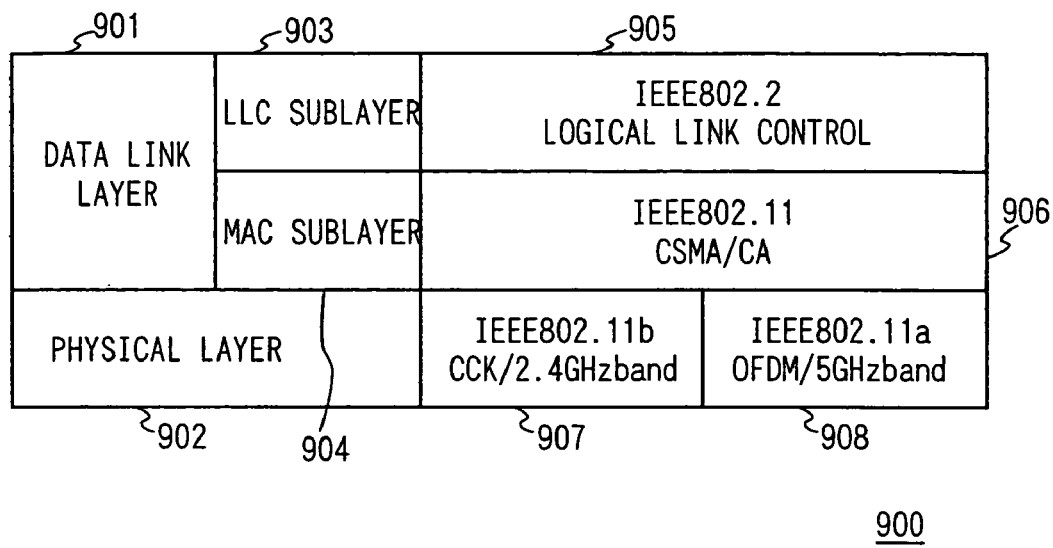
FIG. 9 is a schematic diagram showing a protocol stack of the wireless LAN system.

That is, referring to FIG. 8, the terminal station communication control unit 21 of the terminal station 3 moves on to step SP21 from the start step of the routine RT21. At step SP21, the terminal station communication control unit 21 waits for a beacon (main beacon or sub beacon) from the base station 2 and when receiving the beacon, moves on to next step SP22.

At step SP22, the terminal station communication control unit 21 refers to the following data information 412 and the designation station MAC address 406 in the received beacon, to judges whether there is following data for the own station.

When it is judged at step SP22 that there is following data for the own station, the terminal station communication control unit 21 moves on to step SP23 to receive the downlink data packet and then moves-on to step SP21 to wait for a beacon. When it is judged at step SP22 that there is no following data for the own station, on the contrary, the terminal station communication control unit 21 moves on to step SP24 to judge whether there is uplink transmission data from the own station.

When it is judged at step SP24 that there is no uplink transmission data, the terminal station communication control unit 21 returns back to step SP21 to wait for a beacon. When it is judged at step SP22 that there is uplink transmission data, on the contrary, the terminal station communication control unit 21 moves on to step SP25 to compare the packet length of the uplink data packet with the beacon time period Tn (effective packet length) stored in the main beacon.

When it is judged at step SP25 that the packet length of the uplink data packet is the effective packet length or shorter, the terminal station communication control unit 21 moves on to step SP27. When the data length of the uplink data packet is longer than the effective packet length, on the contrary, the terminal station communication control unit 21 as a data division means moves on to step SP26 to divide the uplink data packet into packets which are the effective packet length or shorter, and then moves on to step SP27.

At step SP27, the terminal station communication control unit 21 refers to the polling information 413 of the received beacon to judge whether polling exists.

When it is judged at step SP27 that the polling exists, the terminal station communication control unit 21 moves on to step S28 to judge based on the destination station MAC address 406 of the received beacon whether the polling is for the own station.

When it is judged at step SP28 that the polling is not for the own station, the terminal station communication control unit 21 puts off the transmission of the uplink data packet and returns back to step SP21. When it is judged at step SP28 that the polling is for the own station, on the contrary, the terminal station communication control unit 21 moves on to step SP31 to transmit the uplink data packet without performing the carrier sense and then returns back to step SP1 to wait for a beacon.

When it is judged at step SP27 that the polling does not exist, on the contrary, the terminal station communication control unit 21 moves on to step SP29 to wait for the random backoff time based on a random number, and then moves on to next step SP30.

At step SP30, the terminal station communication control unit 21 performs the carrier sense. If it does not succeed the carrier sense, the terminal station communication control unit 21 returns back to step SP21 to wait for a beacon. When it succeeds the carrier sense, on the contrary, the terminal station communication control unit 21 as a data transmission means moves on to step SP31 to transmit the uplink data packet and then returns back to step SP1 to wait for a beacon.

As described above, the terminal station 3 performs transmission and reception based on beacons which are transmitted from the base station 2.

(5) Operation and Effects

According to above construction, in this wireless LAN system 1, main beacons are transmitted from the base station 2 at a fixed interval, and a sub beacon is transmitted between the main beacons, the sub beacon including a beacon time period Tn indicative of a period of time until a next main beacon. In addition, the beacon time period Tn is also stored in the main beacon.

Then, each terminal station 3 adjusts the packet length of a data packet to be transmitted, based on the beacon time periods Tn stored in the main and sub beacons, so as to finish the transmission of the data packet before the transmission of a next main beacon is started.

Thereby, overlap of the transmission timings of the data packet and the main beacon can be prevented and the entire data transmission efficiency of the system can be improved. In addition, the base station 2 can transmit main beacons at a fixed interval without fail, and thereby the transmission QoS can be improved, the terminal station 3 can perform the intermittence reception easily and correctly, and the power consumption of the terminal station 3 can be reduced.

Further, by transmitting a main beacon and a sub beacon each including various control information such as the ACK/

NAK information, idle information, following data information and polling information, a polling signal, an ACK signal and so on are not needed to be transmitted independently, thus improving the entire data transmission efficiency of the system. In addition, the base station 2 can manage all the transmission operation of all terminal stations 3 with the control information of the beacon, thereby realizing a useful wireless LAN system capable of performing both of transmission of which the QoS is required by, for example, AV streams and the normal packet transmission, and also solving so-called hidden terminal problem.

(9) Other Embodiments

Note that, the aforementioned embodiment has described the case where the base station 2 as a wireless communication management device manages the entire wireless LAN system 1 and transmits the main and sub beacons. This invention, however, is not limited to this and one of the terminal stations 3 may operate as the wireless communication management device and transmit the main and sub beacons (that is, adhoc communication).

Further, the aforementioned embodiment has described the case where the base station communication control unit 11 of the base station 2 and the terminal station communication control unit 21 of the terminal station 3 perform the transmission/reception process under the base station transmission/reception control program and the terminal station transmission/reception control program being stored in their ROMs, respectively. This invention, however, is not limited to this and by installing program storage media storing such corresponding programs into the base station 2 and the terminal station 3, respectively, the aforementioned transmission/reception processes can be carried out.

In this case, as such a program storage medium to install the aforementioned programs into the base station 2 and the terminal station 3, a semiconductor memory or a magnetic disk for temporally or permanently storing a program as well as a package medium such as a CD-ROM (Compact Disk Read Only Memory) or a DVD (Digital Versatile Disk) may be used. In addition, as a means for storing a program into a program storage medium, a wired or wireless communication medium such as a local area network, the Internet, and digital satellite broadcasting may be used.

According to this invention as described above, a wireless communication management device includes beacon time period information indicative of a period of time until a next main beacon, in a main beacon and a sub beacon, and transmits them, and a wireless terminal device divides and transmits transmission data based on the beacon time period information so that the transmission of the transmission data is finished before transmission of the main beacon is started, thereby the beacon interval can be fixed with sure while preventing overlap of transmission timings of the beacon and the transmission data, thus making it possible to keep transmission quality, to perform intermittence reception with sure, and to improve the entire data transmission efficiency of the system.

INDUSTRIAL UTILIZATION

The wireless communication system of this invention is applied to, for example, a wireless LAN system.

The invention claimed is:

1. A wireless communication system comprising a plurality of wireless terminal devices and a wireless communication management device for managing communication between the wireless terminal devices, wherein:

said wireless communication management device comprises beacon transmission means for transmitting main beacons at a fixed interval to perform synchronization in said wireless communication system and for transmitting sub beacons between said main beacons, wherein said main beacon and said sub beacon include beacon time period information indicating a period of time until said main beacon is transmitted next, and at least one of idle information to allow an unspecified wireless terminal device of said wireless terminal devices to perform transmission, polling information to make a specified wireless terminal device of said wireless terminal devices perform transmission, transmission notification information to make an advance notice of transmission of data after transmission of said beacon to a specified wireless terminal device of said wireless terminal devices, and transmission acknowledgement information indicating for a specified wireless terminal device of said wireless terminal devices whether reception of data transmitted from the wireless terminal device was successful or unsuccessful; and said wireless terminal device comprises:

data division means for comparing said beacon time period information included in said main beacon or said sub beacon received, with a required transmission time of transmission data, and then dividing the transmission data so that transmission of the transmission data divided is finished before next transmission of said main beacon is started when the required transmission time is the beacon time period information or longer; and data transmission means for transmitting said transmission data.

2. A wireless terminal device for performing wireless communication under the control of a prescribed wireless communication management device, said wireless terminal device comprising:

reception means for receiving main beacons that are transmitted at a fixed interval from said wireless communication management device and a sub beacon that is transmitted between the main beacons;

data division means for comparing beacon time period information that is included in said main beacon and said sub beacon received and indicates a period of time until said main beacon is transmitted next, with a required transmission time of transmission data, and when said required transmission time is said beacon time period information or longer, dividing said transmission data so that transmission of the transmission data divided is finished before next transmission of said main beacon is started; and data transmission means for transmitting said transmission data.

3. A communication control method in a wireless communication system comprising a plurality of wireless terminal devices and a wireless communication management device for managing communication between the plurality of wireless terminal devices, wherein:

main beacons for performing synchronization in said wireless communication system are transmitted at a fixed interval from said wireless communication management device, and sub beacons are transmitted between said main beacons from said wireless communication management device;

said main beacon and said sub beacon includes beacon time period information indicating a period of time until said main beacon is transmitted next, and at least one of idle information to allow an unspecified wireless terminal device of said wireless terminal devices to perform transmission, polling information to make a specified wireless terminal device of said wireless terminal devices perform transmission, transmission notification information to make an advance notice of transmission of transmission data after transmission of said beacon to a specified wireless terminal device of said wireless terminal devices, and transmission acknowledgement information indicating for a specified wireless terminal device of said wireless terminal devices whether reception of data transmitted from the wireless terminal device was successful or unsuccessful; and said wireless terminal device compares said beacon time period information included in said main beacon or said sub beacon received, with a required transmission time of transmission data, and when the required transmission time is the beacon time period information or longer, divides said transmission data so that transmission of the transmission data divided is finished before next transmission of said main beacon is started, and transmits the transmission data.

\* \* \* \* \*